3,101,278
FLAME PROOFING OF CELLULOSIC
MATERIALS
George M. Wagner, Lewiston, and Paul E. Hoch, Youngstown, N.Y., assignors to Hooker Chemical Corporation, Niagara Falls, N.Y., a corporation of New York
No Drawing. Filed Nov. 21, 1960, Ser. No. 70,388
19 Claims. (Cl. 117—137)

This invention relates to composition for treating cellulosic materials, to a process for the preparation of flame-retardant cellulosic materials, and to the compositions produced thereby.

Methylol-phosphorus polymers which have nitrogen atoms incorporated in the polymers are known to have excellent flame retarding properties. Such polymers are particularly suitable in the treatment of cellulosic materials such as cotton, rayon, wool, jute, ramie, paper, cardboard and the like. Numerous processes have been developed for treating cellulosic materials with these polymers. For example, in one process a cellulosic material such as cotton cloth is impregnated with an aqueous resin solution containing tetrakis(hydroxymethyl)phosphonium chloride and methylol melamine, the impregnated cloth is dried and then reacted with ammonium hydroxide. Although this technique may be employed to produce a flame-proof cloth, nevertheless, the resulting cloth has a hard finish, since the reaction between ammonia and the methylolphosphorus polymer is extremely rapid, and a hard, nitrogen-containing polymer forms on the surface of the cloth and blocks or prevents further reaction of ammonia with the methylol-phosphorus polymer on the interior of the cloth fibers. As a result, the polymer on the cloth is not uniform. Furthermore, such a process is undesirable from a commercial standpoint, since the cloth must be treated with two separate solutions, and two separate drying steps must be employed.

In another process the cloth to be treated is impregnated with an aqueous solution containing tetrakis(hydroxymethyl)phosphonium chloride, methylol melamine, and ammonium hydroxide, and the resulting impregnated fabric is then dried in air. Such a technique is suitable for treating clothing and the like in the field to render the clothing flame-proof and impervious to certain warfare gases. However, this technique is not suitable for treating cellulosic materials on a commercial scale, because of the rapid solidification of the polymer when ammonia is contacted with tetrakis(hydroxymethyl)phosphonium chloride.

In these and other similar reactions wherein polymers containing nitrogen and phosphorus are formed from tetrakis($\alpha$-hydroxyorgano)phosphonium chloride compounds and nitrogen-containing compounds, the rapid rate of polymerization has created serious problems when these proceses are applied on a commercial scale. While we do not wish to be bound by theory, it is believed that the rapid rate of polymerization in these processes is caused, at least in part, by the presence of an aldehyde such as formaldehyde, which is formed in some stage of the polymerization reaction. We have discovered that when an aldehyde-combining substance is admixed with the hydroxyorgano phosphonium chloride compound, either prior to or simultaneous with the reaction of the phosphonium compound with a nitrogen-containing compound, a marked inhibition of the rate of polymerization is obtained.

It is an object of this invention to provide a novel polymerization inhibitor capable of inhibiting the formation of polymers containing phosphorus and nitrogen.

A further object of the invention is to provide a novel method for inhibiting the rate of polymerization of hydroxyorgano phosphonium chloride compounds and nitrogen-containing compounds.

Still another object of the invention is to provide novel compositions for treating cellulosic materials.

It is another object of this invention to provide an improved process for preparing flame-resistant cellulosic materials.

A further object of this invention is to provide improved flame-resistant cellulosic materials.

Still another object of the invention is to provide a method of decreasing the rate of reaction between hydroxyorgano phosphonium chloride compounds and nitrogen-containing salts.

Another object of the invention is to provide flame-retardant cellulosic textiles having improved hand and other physical properties.

It is another object of the invention to provide resin-coated cellulosic textiles which retain their flame-retardant characteristics after frequent launderings.

These and other objects of the invention will be apparent from the following detailed description.

It has now been discovered that when a substance capable of combining with an aldehyde is admixed with a hydroxyorgano phosphonium chloride compound having the formula

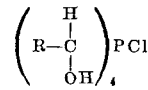

where R is as defined below, and the resulting mixture is reacted with a nitrogen-containing compound to yield a polymer containing nitrogen and phosphorus, there is a marked inhibition of the rate of polymerization. If desired, the substance capable of combining with an aldehyde may be admixed simultaneously with the hydroxyorgano phosphonium chloride compound and the nitrogen-containing compound. Because of the polymerization inhibiting effects of the mixture of the hydroxyorgano phosphonium chloride compound and the aldehyde-combining substance, aqueous solutions containing this mixture and a nitrogen-containing compound are highly stable, and do not readily polymerize or solidify unless subjected to an elevated temperature. As a result, it is now possible to impregnate cellulosic materials with aqueous solutions containing the hydroxyorgano phosphonium chloride compound, the aldehyde-combining substance, and the nitrogen-containing compound and thereby obtain a more complete penetration of the cellulosic material with the resulting polymer. It has been further discovered that flame-retardant cellulosic materials having improved physical properties can be prepared by impregnating the cellulosic material with an aqueous resin solution containing a hydroxyorgano phosphonium chloride compound having the formula defined below, a water-soluble cyclic nitrogen-containing compound, a substance capable of combining with an aldehyde and a nitrogen-containing salt, and then drying and curing the resulting resin impregnated cellulosic material. When a cellulosic textile is treated in accordance with the instant invention, the resin impregnated textile has markedly improved hand, tear strength, tensile strength and flame-retarding properties, when compared with textiles treated with resins by teachniques of the prior art.

The term "hydroxyorgano phosphonium chloride compounds" is used throughout the description to define water-soluble tetrakis($\alpha$-hydroxyorgano)phosphonium chloride compounds having the formula

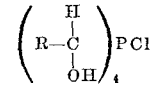

where R is a hydrogen, lower alkyls having between about one and about three carbon atoms, chlorinated lower alkyls having between about one and about three carbon atoms, lower alkenyl having from two to three carbon atoms and lower chlorinated alkenyls having from two to three carbon atoms. Typical examples of suitable water-soluble hydroxyorgano phosphonium chloride compounds are tetrakis(hydroxymethyl)phosphonium chloride, tetrakis(α-hydroxyethyl)phosphonium chloride, tetrakis(α-hydroxypropyl)phosphonium chloride, tetrakis-(α-hydroxypropenyl)phosphonium chloride, tetrakis(α-hydroxybutenyl)phosphonium chloride and mixtures thereof. The phosphonium compound may be used in monomer form or in a partially polymerized form, so long as it is still water-soluble. For example, tetrakis(hydroxymethyl)phosphonium chloride may be heated to effect partial polymerization before dissolving in the aqueous solution.

Suitable substances capable of combining with aldehyde produced by polymerization of a hydroxyorgano phosphonium chloride compound with a nitrogen-containing compound include inorganic sulfites, tertiary amine sulfites, secondary amines, primary amines, reactive methylene compounds having active hydrogens, and mixtures thereof. Typical examples of suitable inorganic sulfites include ammonium sulfite, ammonium bisulfite, sodium sulfite, sodium bisulfite, potassium sulfite, potassium bisulfite, lithium sulfite, lithium bisulfite, and mixtures thereof, alkaline earth metal sulfites such as calcium sulfite, calcium bisulfite, barium sulfite, barium bisulfite, magnesium sulfite and mixtures thereof.

Typical examples of suitable tertiary amine sulfites and tertiary amine bisulfites include the sulfites and bisulfites of triethanol amine, triisopropyl amine, triethyl amine, tripropanol amine, tributyl amine, and mixtures thereof. The term "sulfite" as used throughout the description and claims is intended to include sulfites, bisulfites and mixtures thereof.

Typical examples of suitable primary amines include methylamine, propylamine, octylamine, decylamine, ethanolamine, propanolamine, cyclic amines such as cyclopentylamine, cyclohexylamine and alkyl-substituted derivatives thereof, and such substances as semicarbazides, hydrazides, hydrazines, and amino guanidine.

Typical examples of suitable secondary amines include dialkylamines, such as dimethylamine, diethylamine, dibutylamine, diamylamine, dioctylamine, didecylamine, methylethylamine, ethylbutylamine, etc.; cyclic amines such as morpholine, piperidine, cyclohexylmethylamine, cyclopentylethylamine, and the like. Also included are diarylamine, such as diphenylamine and ditoluylamine; arylalkylamines, such as methylphenylamine and octylphenylamine; dialkanolamines such as diethanolamine, dibutanolamine, dioctanolamine, etc.; mixed dialkanolamines such as isopropanolethanolamine, etc.; and mixed alkylalkanolamines such as ethylethanolamine, butylethanolamine, octylethanolamine, etc., methylisopropanolamine, and ethylbutanolamine etc., and the like.

Typical examples of suitable reactive methylene compounds having acidic hydrogen include acetyl acetone, 1,3-cyclopentadione and 1,3-cyclohexadione.

If desired, a polymerization inhibiting effect can be obtained by contacting gaseous sulfur dioxide with an aqueous solution containing hydroxy organo phosphonium chloride compound under alkaline conditions sufficient to convert $SO_2$ to the sulfite ion.

The substance capable of combining with an aldehyde is admixed with the hydroxyorgano phosphonium chloride compound in a proportion equivalent to between about 0.9 and about two moles, and preferably between about one and about 1.4 moles per mole of the hydroxyorgano phosphonium chloride compound. However, any proportion capable of inhibiting the polymerization of the hydroxyorgano phosphonium chloride compound and the nitrogen-containing compound may be employed.

The polymerization inhibiting effect obtained by admixing a hydroxyorgano phosphonium chloride compound with one of the aforesaid substances capable of combining with an aldehyde in the presence of a nitrogen-containing compound, can be utilized in any polymerization technique where the rapid rate of polymerization of the hydroxyorgano phosphonium chloride compound or its derivatives with a nitrogen-containing compound creates a problem. For example, when an aqueous solution containing a hydroxyorgano phosphonium chloride compound such as tetrakis(hydroxymethyl)phosphonium chloride, a substance capable of combining with formaldehyde such as sodium sulfite, and a nitrogen-containing compound such as ammonia, ammonium sulfate, ammonium phosphate, ammonium chloride, ammonium bromide, ammonium iodide, ammonium nitrate, and ammonium hydroxide, and the resulting solution is used to impregnate a cellulosic material such as a cellulosic textile, the rate of polymerization is markedly inhibited, thereby permitting substantially complete penetration of the cellulosic textile before polymerization is complete. As a result the nitrogen-phosphorus containing polymer that forms is substantially completely distributed throughout the fibers of the cellulosic textile. Complete distribution of the resulting polymer on the textile in this manner markedly improves the flameproofing properties of the textile and further improves the hand and texture of the resulting treated textile. Other illustrations of processes in which the polymerization inhibiting effect of the mixture of hydroxyorgano phosphonium chloride compound and a substance capable of combining with an aldehyde such as formaldehyde may include the process disclosed in United States Patent No. 2,772,188, issued November 27, 1956, to Wilson A. Reeves et al., wherein a hydroxymethyl phosphonium chloride compound is reacted with a water-soluble methylol melamine to yield a further polymerizable methylol-phosphorus polymer and this polymer is then reacted with ammonia to incorporate nitrogen into the polymer. Other processes to which applicants' novel polymerization inhibiting technique can be applied include the processes disclosed in United States Patent No. 2,809,941, issued October 15, 1957, to Wilson A. Reeves et al.; United States Patent No. 2,810,701, issued October 22, 1957, to Wilson A. Reeves et al.; and United States Patent No. 2,812,311, issued November 5, 1957, to Wilson A. Reeves et al. Applicants' novel polymerization inhibiting composition is utilized in the above-mentioned processes by substituting a mixture of the hydroxyorgano phosphonium chloride compound and a substance capable of combining with an aldehyde, in the above-defined proportions, for the hydroxyorgano phosphonium chloride compound described in these processes.

When a sulfite is employed as the substance capable of combining with formaldehyde, suitable nitrogen-containing compounds that may be employed, in addition to those already mentioned, include primary amines containing at least one amine group, such as methylamine, propylamine, octylamine, decylamine, ethanolamine, propanolamine, cyclic amines such as cyclopentylamine, cyclohexylamine and alkyl substituted derivatives thereof, and such substances as semi-carbazides, hydrazines, hydrazides, amino guanidine, ethylenediamine, phenylenediamine, hexamethylenediamine, tetramethylenepentaamine, trimethylenetetraamine and mixtures thereof. Also suitable are the secondary amines containing at least two amine groups such as N,N'-dimethylethylenediamine, N,N'-dimethylhydrazine, N,N'-methylphenylenediamine and mixtures thereof.

In a preferred embodiment of the invention a novel composition suitable for rendering cellulosic materials flame retardant is prepared by admixing a tetrakis(α-hydroxyorgano)phosphonium chloride compound, a sulfite compound capable of combining with an aldehyde, a water soluble cyclic nitrogen-containing compound, a nitrogen-containing salt of a strong acid, and water. The resulting resin solution is then used to impregnate cellulosic materials such as cellulosic textiles, and the resin impregnated material is then dried and the resin is cured.

Water soluble cyclic nitrogen-containing compounds suitable for use in the instant invention include triazines and dimethylol cyclic alkylene ureas. Typical examples of suitable triazines include methylol melamine, dimethylol triazine, modified methylol melamines, such as the trimethyl ether of methylol melamine, and mixtures thereof. Typical examples of suitable cyclic alkylene ureas include dimethylol ethylene urea and dimethylol propylene urea.

Nitrogen-containing salts of strong inorganic acids suitable for use in the instant invention include ammonium salts of strong acids, primary amines salts of strong acids, aromatic amine salts of strong acids, and cyclic amine salts of strong acids. Strong inorganic acids capable of yielding the nitrogen-containing salts contemplated in the instant invention include sulfuric, phosphoric, hydrochloric, hydrobromic, hydriodic, and nitric acids, and mixtures thereof. Typical examples of suitable ammonium salts of strong acids include ammonium sulfate, ammonium phosphates, ammonium chloride, ammonium bromide, ammonium iodide, ammonium nitrate, and mixtures thereof. Typical examples of suitable primary amine, aromatic amine and cyclic amine salts of strong acids include ethanolamine-sulfuric acid, hydrazine dihydrochloride, alkyl amine salts of the aforesaid strong acids wherein the alkyl contains between one and about twenty carbon atoms, aniline salts of the aforesaid strong acids, and cyclohexylamine salts of the aforesaid strong acids. If desired, the nitrogen-containing salt of a strong acid can be replaced with a mixture of a nitrogen-containing salt of a weak organic acid and a catalyst such as the magnesium, zinc and tertiary amine salts of the aforesaid strong inorganic acids.

The approximate proportions of the aforesaid components used in preparing the aqueous resin solution are as follows:

| Component: | Proportion |
| --- | --- |
| Hydroxyorgano phosphonium chloride compound | 10 to 30 percent by weight. |
| Cyclic nitrogen-containing compound | 5 to 15 percent by weight. |
| Nitrogen-containing salt of a strong acid | 1 to 10 percent by weight. |
| Urea | 0 to 10 percent by weight. |
| Sulfite compound capable of combining with an aldehyde | 0.9 to 2 moles per mole of hydroxyorgano phosphonium chloride compound. |
| Water | 40 to 80 percent by weight. |

As indicated in the above table it is not necessary to employ urea as a component of the aqueous resin solution, but urea may be employed in proportions up to about ten percent by weight of the solution if desired, to improve the char characteristics of the resulting treated cellulosic material. It is preferred to employ the sulfite compound in a proportion equivalent to between about one and about 1.4 moles per mole of the hydroxyorgano phosphonium chloride compound. It is preferred to employ water in a proportion equivalent to between about fifty and about seventy percent by weight of the aqueous resin solution. Greater or lesser proportions of the aforesaid ingredients may be employed so long as the rate of polymer formation is sufficiently decreased to yield a uniform polymer on the cellulosic material and so long as the solution contains sufficient resin to provide the cellulosic material with an adequate resin add-on.

The proportion of resin add-on (dry basis), necessary to impart the aforesaid improved characteristics to the cellulosic material is generally between about nine and about thirty percent by weight of the cellulosic material.

Various techniques can be employed for impregnating the cellulosic material with the aqueous resin solution. In one embodiment of the invention, the hydroxyorgano phosphonium compound, cyclic nitrogen-containing compound, sulfite compound, and nitrogen-containing salt of a strong acid are dissolved in water simultaneously, and the resulting aqueous resin solution is fed to a suitable container such as a padding box. The textile or other cellulosic material to be treated is immersed in the resulting solution. After the cellulosic material is impregnated with the aqueous resin solution, it is passed through a squeeze roll or other means for removing excess solution. The textile impregnated with the aqueous resin solution may be heated or otherwise treated to remove excess water, and to effect curing of the resin on the textile. Drying of the treated cloth can be effected in a conventional forced hot air oven at a temperature between about ninety and about one hundred and ten degrees centigrade, for between about one and about ten minutes, and curing of the resin can be effected in the same apparatus at a temperature of between about one hundred and twenty and about one hundred and fifty degrees centigrade, for between about one and about ten minutes. However, any temperature and time conditions under which substantially all of the free water is removed and the resin is cured may be employed. For example, the textile impregnated with the aqueous resin solution may be stored under atmospheric conditions overnight to effect drying of the cloth and curing of the resin when the aqueous resin solution contains a relatively high proportion of ammonia, for example between about five and about ten percent by weight. In another modification, the dry resin coated textile may be cured in an infrared oven where the treated cloth is exposed to an elevated temperature, for example between about five hundred and about seven hundred degrees Fahrenheit for between about five and about ten seconds.

After drying and curing, the resin impregnated cellulosic textile is then scoured to remove excess sulfite, unpolymerized resin, and the anion of the nitrogen-containing salt of a strong acid. Scouring of the treated material may be effected by immersing the treated cellulosic textile in an aqueous soap solution containing a small proportion of soap and a small proportion of sodium carbonate. The scoured resin treated textile is then dried as described above.

In another embodiment of the invention an aqueous solution of the hydroxyorgano phosphonium chloride compound, the cyclic nitrogen-containing compound, and the sulfite compound is prepared, employing the preferred proportions defined above, and the cellulosic material is impregnated with this solution. The impregnated material is than sprayed with an aqueous solution of a nitrogen-containing salt of a strong acid, such as ammonium sulfate. Any suitable concentration may be employed, but it is preferred to use an aqueous solution containing between about twenty-five and about forty percent by weight of the nitrogen-containing salt of a strong acid. A sufficient amount of this solution is contacted with the impregnated cellulosic material to provide the nitrogen-containing salt in a proportion equivalent to between about two and about forty percent by weight of the resin forming ingredients on the cellulosic material. Since the sulfite compound inhibits rapid reaction between the nitrogen-containing compound and the hydroxyorgano phosphonium chloride compound, the cellulosic material is substantially completely impregnated with the aqueous solution of the nitrogen-containing salt of a strong acid, thereby yielding a polymer of substantially uniform composition throughout the cellulosic material. When an aqueous ammonia-containing solution is sprayed on cellulosic materials impregnated with a methylol-phosphorus polymer in the absence of a sulfite compound, as in the prior art, rapid formation of the nitrogen-containing methylol-phosphorus polymer occurs on the outer surfaces of the material, which in turn inhibits complete reaction of the nitrogen compound with the methylol-phosphorus polymer on the interior surfaces of the fibers. Furthermore, in prior art techniques the resin impregnated cellulosic material must be dried before spraying the ammonia solution onto the cellulosic material, while in the instant invention, drying of the resin impregnated cellulosic material is not necessary before spraying with an ammonia-containing solution.

In another modification of the invention, the cellulosic material is impregnated with an aqueous solution containing a hydroxyorgano phosphonium chloride compound, a cyclic nitrogen-containing compound, and a sulfite compound. The impregnated cellulosic material is then passed through squeeze rolls, where one or both of the rolls are in contact with an aqueous solution of a nitrogen-containing salt of a strong acid. When this technique is employed the nitrogen-containing salt of a strong acid is squeezed into the cellulosic material containing the hydroxyorgano phosphonium chloride compound, and a uniform polymer is thereby formed throughout the cellulosic material.

The polymer or resin formed on the cellulosic material by the instant novel process is the reaction product of the hydroxyorgano phosphonium chloride compound, the cyclic nitrogen-containing compound, the nitrogen-containing salt of a strong acid, and, if desired, urea. When employing the resin forming ingredients in the proportions described above, the resulting resin is the reaction product formed from resin forming ingredients comprised of between about twenty and about ninety percent by weight of the hydroxyorgano phosphonium chloride compound, between about ten and about sixty percent by weight of the cyclic nitrogen-containing compound, between about two and about forty percent by weight of the nitrogen-containing salt of a strong acid, and between about zero and about forty percent by weight of urea.

In a more preferred embodiment of the invention an aqueous resin solution is prepared from the following components in the following proportions.

Component: | Proportions
--- | ---
Tetrakis(hydroxymethyl) phosphonium chloride. | 10 to 30 percent by weight.
Methylol melamine | 5 to 15 percent by weight.
Ammonium sulfate | 1 to 10 percent by weight.
Urea | 0 to 10 percent by weight.
Sodium sulfite | 1 to 1.4 moles per mole of tetrakis(hydroxymethyl) phosphonium chloride.
Water | 40 to 80 percent by weight.

When an ammonium compound is added to an aqueous solution of a hydroxyorgano phosphonium chloride compound, in the absence of a sulfite compound, the time required for the entire mass to polymerize and solidify is generally but a few minutes. However, when a sulfite is added to the solution in accordance with the instant novel invention as described above, the time necessary for polymerization and solidification is extended to as much as about six hours. As a result, the cellulosic material can be impregnated with the hydroxyorgano phosphonium chloride compound and the nitrogen-containing salt of a strong acid before the solid nitrogen-containing polymer forms. Cellulosic textiles treated in accordance with the instant invention have an improved hand, have improved tensile strength, and improved tear strength because of the substantially uniform polymer composition throughout the cloth. In addition, since the nitrogen-containing polymer is distributed more uniformly throughout the cloth, improved flame-retardance can be obtained with a smaller proportion of resin add-on than is required by previously known techniques.

The following examples are presented to define the invention more fully without any intention of being limited thereby. All parts and percentages are by weight unless otherwise indicated.

EXAMPLES 1 to 3

Three aqueous resin solutions were prepared, designated as solution A, B and C, respectively. Solutions A and B were prepared by dissolving trimethylolmelamine in the desired amount of water, followed by dissolving urea, tetrakis(hydroxymethyl)phosphonium chloride and sodium sulfite in the proportions set forth below in Table A. Prior to the addition of sodium sulfite the pH of the solution containing trimethylolmelamine, urea and tetrakis-(hydroxymethyl)phosphonium chloride was about 3.5. After dissolving the sodium sulfite the pH increased to about nine. Ammonium sulfate was then added in the proportions set forth below in Table A. The pH of the resulting solution then varied between about six and about seven. Solution C was prepared in a similar manner by dissolving trimethylolmelamine, triethanolamine, urea and tetrakis(hydroxymethyl)phosphonium chloride in water in the proportions set forth in Table A. The components and proportions of components were as follows:

*Table A*

| Components | Parts in solution | | |
| --- | --- | --- | --- |
| | A | B | C |
| Tetrakis(hydroxymethyl)phosphonium chloride | 17 | 17 | 18.0 |
| Trimethylolmelamine | 12 | 12 | 11.4 |
| Urea | 5 | 5 | 10.4 |
| $Na_2SO_3$ | 13 | 13 | |
| $(NH_4)SO_4$ | 2 | 3 | |
| Triethanolamine | | | 3.6 |
| Water | 51 | 50 | 56.6 |
| | 100 | 100 | 100.0 |

A sample of six ounce bleached, undyed cotton twill was then immersed in each of the solutions, and each sample was passed through squeeze rolls to remove excess aqueous resin solution. The moist cloths were weighed and then heated in an oven for about ten minutes at a temperature of three hundred degrees Fahrenheit to effect drying and curing. The treated cloth samples were weighed, scoured, dried and then subjected to the standard char test.

The char test was carried out in accordance with the procedure of the American Association of Textile Chemists and Colorists, Test AATCC 34–1952. In this test a strip of cloth to be tested is secured on each of its long sides in a vertical position, leaving an exposed area of approximately ten inches by two and one-quarter inches. A Bunsen burner is positioned below the bottom of the cloth so that the top of the burner is about three-quarters of an inch from the cloth, and so that the burner produces a flame which is about one and one-half inches high. The flame is produced by burning natural gas in the absence of air. The cloth is exposed to the flame for a period of twelve seconds, and the flame is then turned off. The cloth is then removed from the securing means and a weight is attached to one side of the char, the weight being equivalent to about ten percent of the tear strength of the cloth. The opposite side of the cloth is then pulled to produce a tear along the char. The length of the tear is then measured to determine the char in inches.

The tear strength was determined in accordance with the procedure of the Elmendorf tear test, Federal Specification CCC–T–191b, #5132. The tensile strength was determined in accordance with Federal Specification CCC–T–191b, #5100, using a Scott tensile tester.

The samples were boiled in a soap solution for three hours, dried and then subjected to the char test. The results of these tests are set forth below in Table B.

*Table B*

| Example | 1 Solution A | 2 Solution B | 3 Solution C |
|---|---|---|---|
| Wet pick-up, percent | 82 | 82 | 78 |
| Resin add-on, percent (dry basis) | 17.5 | 18.4 | 21.8 |
| Char, inches | 3.6 | 3.4 | 3.0 |
| Char after 3 hr. boil, inches | 3.5 | 3.8 | 5.5 |
| Tear, strength, grams | 800 | 800 | 670 |
| Hand | Excellent | Excellent | Boardy |

It can be seen from these results that when the instant novel technique is employed, as demonstrated by treating the cloth with solutions A and B, that a cellulosic material having improved flame-retardant properties and improved hand is readily obtained. For purposes of comparison the cloth treated with solution C, a solution disclosed by the prior art, the resulting cloth was flame-retardant, but had a poor hand and poor tear strength.

EXAMPLES 4 AND 5

The procedure of Example 1 was repeated, varying the proportion of components as indicated in Table C.

*Table C*

| Component | Example 4 | Example 5 |
|---|---|---|
| Tetrakis(hydroxymethyl)phosphonium chloride | 48 | 48 |
| Triethanolamine |  | 10 |
| Melamine | 24 | 24 |
| Urea | 10 | 20 |
| $Na_2SO_3$ | 38 |  |
| $(NH_4)_2SO_4$ | 4 |  |
| Water | 86 | 108 |
|  | 210 | 210 |

Samples of a six ounce green dyed cotton twill were impregnated with the aforesaid solutions. The impregnated cloths after drying and curing, as in Example 1, were then tested in the same manner. The results of these tests were as follows:

*Table D*

| | Example 4 | Example 5 |
|---|---|---|
| Wet pick-up, percent | 93 | 95 |
| Resin add-on after scour, percent (dry basis) | 25.3 | 31.7 |
| Char, inches | 2.8 | 3.0 |
| Tear, unsoftened, grams | 1,120 | 800 |
| Tear, softened, 0.4 percent cationic softener, grams | 1,500 | 1,130 |
| Char after 3 hr. boil, inches | 3.5 | 3.0 |
| Hand | Excellent | Very boardy |

Treating the cloth in accordance with the technique of the instant invention, as in Example 4, yielded a cloth having improved hand and improved tear strength as compared with cloth treated in accordance with the technique of the prior art, as demonstrated in Example 5.

EXAMPLE 6

An aqueous resin solution containing two hundred and fifty parts of tetrakis(hydroxymethyl)phosphonium chloride, one hundred and twenty parts of trimethylolmelamine, fifty parts of urea, one hundred and ninety parts of sodium sulfite, and three hundred and ninety parts of water was prepared and placed in a cloth padder. A cotton cloth (3.3 yards per pound broadcloth, 136/60), was padded through the solution in the padder at a rate of about ten yards per minute. The cloth which passed from the padding solution had a wet pick-up of about eighty percent. The cloth passing from the padder was immediately sprayed with a ten percent aqueous ammonium sulfate solution by means of a spray nozzle operating under a pressure of thirty p.s.i. Sufficient ammonium sulfate solution was sprayed onto the cloth to provide an additional wet pick-up of about thirty percent. After spraying, the cloth was dried and cured at a temperature of three hundred degrees Fahrenheit for 4.5 minutes. The cloth was scoured by immersing in an aqueous soap solution containing sodium carbonate and then dried. The treated cloth contained about twenty-five percent resin add-on. A sample of the treated cloth, when subjected to the char test, had a char of 3.5 inches. The tear strength of the unsoftened cloth was about three hundred and ninety grams. After boiling the treated cloth for three hours in a soap solution, a char of about 3.6 inches was obtained. The hand of the treated cloth was excellent.

EXAMPLES 7–14

An aqueous solution, identified as "solution No. 1," was prepared from the following components in the following proportions.

| Component: | Grams |
|---|---|
| Tetrakis(hydroxymethyl)phosphonium chloride | 576 |
| Trimethylolmelamine | 363 |
| Urea | 73.6 |
| Sodium sulfite | 403.2 |
| Sodium bisulfite (meta) | 51.6 |
| Water | 1,424 |

Solution No. 1 was prepared by dissolving sodium sulfite and sodium bisulfite in water, followed by dissolving tetrakis(hydroxymethyl)phosphonium chloride therein, and allowing a period of about fifteen minutes to elapse for reaction between the phosphonium chloride and the sodium salts. Trimethylolmelamine and urea were then dissolved in the solution. A salt of a strong acid, as identified in the following table, was then dissolved in one of eight portions of solution No. 1. Each portion of solution No. 1 weighed one hundred and eighty grams. Samples of six ounce bleached cotton twill were then impregnated with one of the resulting eight aqueous resin solutions, each cotton sample was then dried and cured for four minutes at a temperature of three hundred degrees Fahrenheit. Each sample of resin impregnated cloth was then subjected to a scour, dried, and weighed to determine the percent resin add-on. The fabrics were then subjected to the standard char test, the tear strength test, and the tensile strength test defined in Example No. 1. Each treated sample was then heated for three hours at boiling in an aqueous solution containing two-tenths of a percent of soda ash, and then subjected to the standard char test. The strong acid salts employed in treating the cloths in these tests, and the characteristics of the resulting cloths are presented below in Table E.

Table E

| Example | 7 | 8 | 9 | 10 | 11 | 12 | 13 | 14 |
|---|---|---|---|---|---|---|---|---|
| Salt of strong acid | Ethanol-amine-sulfuric acid. | Hydrazinedi-hydrochloride. | Ethylenedi-amine disulfuric acid. | Diammonium phosphate. | Ammonium sulfate. | Ammonium sulfate plus polyethylene softener. | Diethylamine-sulfuric acid. | Ammonium carbonate. |
| Gms. of salt of strong acid. | 19 | 4.1 | 1.8 | 2.5 | 5.0 | 5.0+0.5% | 42 | 3.9. |
| Percent wet pick-up | 88 | 86 | 87 | 87 | 88 | 87 | 83 | 86. |
| Percent resin add-on (after scour). | 20.9 | 19.0 | 20.0 | 17.8 | 18.1 | 16.7 | 17.1 | 1.3. |
| Char, inches | 3.9 | 3.0 | 3.8 | 4.5 | 3.3 | 3.8 | 3.3 | Burned. |
| Tear strength (unsoftened). | 690 | 625 | 675 | 755 | 820 | 1,540 | 740 | |
| Tensile strength, p.s.i. | 87 | 87 | 88 | 84 | 84 | 81 | 80 | |
| Char, inches, after 3 hrs. boiling in an aqueous solution containing 0.2% soap and 0.2% soda ash. | 4.3 | 3.9 | 6.5 | 4.8 | 4.3 | 3.8 | Burned | Burned. |

The bleached cotton twill had a tensile strength of eighty-nine pounds per square inch, and a tear strength of eleven hundred and seventy grams prior to treatment with the aforesaid aqueous resin solutions.

It can be seen from these tests that when a cellulosic textile is treated in accordance with the instant invention, as shown in Examples 7 through 12, cellulosic textiles possessing markedly superior flame-retarding properties, and having satisfactory tear strength and tensile strength are produced. In contrast, when a salt other than an ammonia-containing salt of a strong acid or a primary amine salt of a strong acid is added to the aqueous resin solution, inferior cloths are produced. For example, in Example 13, when a secondary amine salt was employed, the cloth after boiling was not flame resistant. In Example 14, when an ammonium salt of a weak acid was employed, the treated cloth burned even before boiling for three hours in the soap solution. Example 13 shows that although under certain conditions, these resins may impart initial flame-retarding properties to the cloth, nevertheless, these flame-retarding properties are removed when subjected to moderate laundering conditions. In marked contrast, in Examples 7 through 12, which illustrate the invention, the flame-proofing properties of the resin treated cloth were retained even after boiling for three hours in an aqueous soap solution.

*Example 15*

In order to demonstrate the effectiveness of the alkali metal sulfite in the resin treating solution, a solution was prepared containing fifteen grams of tetrakis(hydroxymethyl)phosphonium chloride, ten grams of trimethylolmelamine, and ninety-eight grams of water. To this solution was added 1.5 grams of an aqueous twenty-eight percent ammonium hydroxide solution. Cotton cloth was then completely padded with the resulting solution to yield an impregnated cloth having an eighty-five percent wet pick-up. The impregnated cloth was dried in air for about twenty-four hours, then scoured in an aqueous solution containing about 0.2 percent non-ionic detergent and about 0.2 percent soda ash. After scouring and drying, the resin-treated cloth was found to contain 2.7 percent resin add-on, and when subjected to the standard char test, the treated cloth burned. In addition, the remaining solution polymerized in fifteen minutes to a solid.

EXAMPLE 16

The following solution was prepared.

| Component: | Proportion, lbs. |
|---|---|
| Tetrakis(hydroxymethyl)phosphonium chloride | 24.0 |
| Trimethylolmelamine | 13.3 |
| Urea | 2.6 |
| $Na_2SO_4$ | 18.1 |
| $(NH_4)_2SO_4$ | 3.3 |
| Water | 58.7 |
| | 120.0 | by first dissolving the trimethylolmelamine and urea in the water, then adding tetrakis(hydroxymethyl)phosphonium chloride, followed by $Na_2SO_3$. $(NH_4)_2SO_4$ was added last, just prior to padding.

Battle-ax fabric (nine ounces/yard) was padded with the resin solution at a one hundred percent wet pick-up. The fabric after impregnation, was dried on dry cans heated to two hundred and twenty degrees Fahrenheit, then passed through an infrared oven heated to seven hundred degrees Fahrenheit. Retention time in the oven was about eleven seconds. The cloth was then scoured in rope form in a solution containing 0.2 percent soda ash and 0.2 percent non-ionic detergent, rinsed, top softened with 0.5 percent of a cationic type softener, and dried on dry cans.

The treated cloth had an excellent hand, was completely flame-retardant and had retained its original strength. These properties are given below.

| | |
|---|---|
| Percent resin add-on | 19.7. |
| Tensile strength, lbs. (warp) | 116. |
| Tear strength, lbs. (fill) | 6.0. |
| Stiffness, Gurley, mg. (warp) | 70. |
| Char, inches | 3.0. |
| Casual match test | Does not burn. |
| ¼" strip match test | Does not burn. |

PROPERTIES AFTER THREE HOURS' BOIL IN AQUEOUS SOLUTION OF 0.2% SOAP AND 0.2% SODA ASH

| | |
|---|---|
| Char, inches | 2.5. |
| Casual match test | Does not burn. |
| ¼" strip match test | Does not burn. |

PROPERTIES AFTER SIX HOURS' BOIL

Char, inches _____ 3.3.

PROPERTIES AFTER TWENTY COMMERCIAL LAUNDERINGS (INCLUDES BLEACH CYCLE)

Char, inches _____ 3.3.

PROPERTIES AFTER THIRTY COMMERCIAL LAUNDERINGS (INCLUDES HYPOCHLORITE BLEACH CYCLE)

| | |
|---|---|
| Char, inches | 3.3. |
| Tensile strength | 110 lbs. |
| Hand | Soft, flexible, no obvious change from unwashed fabric. |

PROPERTIES OF UNTREATED CLOTH

| | |
|---|---|
| Tensile strength, lbs. (warp) | 110. |
| Tear strength, lbs. (fill) | 6.0. |
| Stiffness, Gurley, mg. (warp) | 30. |
| Stiffness, Gurley, mg. (warp) of same fabric, finished and sized but not flame-proofed | 120. |

Thus, the treated fabric was still flame retardant after thirty commercial launderings, and still retained its original tensile strength and excellent hand.

The stiffness data show that there is only a slight increase in stiffness from thirty mg. (untreated) to seventy mg. (treated). This is less stiffness than is found in garments manufactured from this same fabric suitably sized and finished (one hundred and twenty mg.).

*Example 17*

A rayon lining twill (3.5 oz./sq. yd.), was impregnated with the following solution:

| Component: | Weight percent |
|---|---|
| Tetrakis(hydroxymethyl)phosphonium chloride | 20.0 |
| Trimethylolmelamine | 12.5 |
| Urea | 2.5 |
| Sodium sulfite | 14.0 |
| Sodium bisulfite (meta) | 1.4 |
| Ammonium sulfite | 2.5 |
| Water | 47.1 |
| | 100.0 |

The solution was prepared by dissolving the tetrakis(hydroxymethyl)phosphonium chloride in water and adding the sulfite salts. After fifteen minutes, the urea, melamine and ammonium sulfate were added in that order. The fabric was padded using two dips and two nips to obtain a wet pick-up of one hundred and twelve percent. After drying and curing at two hundred and seventy-five degrees Fahrenheit for about 4.0 minutes, then scouring in an aqueous solution containing 0.2 percent non-ionic detergent and 0.2 percent soda ash and drying, the cloth retained 23.9 percent resin add-on.

The fabric possessed an excellent hand, differing only from the untreated fabric in that the hand was more lively and possessed a degree of crush resistance. Char length of a test specimen was 4.4 inches, and tensile strength was one hundred and two pounds in the warp and fifty-eight pounds in the filling. This compares with ninety-eight pounds and fifty-six pounds in the warp and filling, respectively, for the untreated fabric.

After five launderings, the char length was 5.0 inches.

EXAMPLE 18

A solution was prepared by dissolving four hundred grams of tetrakis(hydroxymethyl)phosphonium chloride in eight hundred and forty-two grams of water. Sodium sulfite (two hundred and eighty grams) and sodium metabisulfite (twenty-eight grams) were then dissolved in the solution. This solution was stable after storage for several months.

At the end of ten days of storage, a one hundred and sixty gram portion of this solution was formulated into a stable textile treating composition for flame retarding textiles by adding twenty-five grams of methylolmelamine, five grams of urea and five grams of ammonium sulfate. A fabric (six ounces per square yard) was impregnated with this solution, dried, cured at three hundred degrees Fahrenheit for three minutes and scoured. The cloth was flame retardant and the hand of the fabric essentially unchanged.

EXAMPLE 19

After the solution of tetrakis(hydroxymethyl)phosphonium chloride and sodium sulfites of Example 18 had aged two months, a one hundred and sixty gram portion was admixed with five grams of ammonium sulfate and two grams of an aqueous twenty-eight percent solution of ammonia. A stable solution was formed which polymerized readily at elevated temperatures.

EXAMPLE 20

The following solution was prepared:

| Component: | Weight, grams |
|---|---|
| Tetrakis(hydroxymethyl)phosphonium chloride | 19 |
| $Na_2S_2O_5$ | 9.5 |
| NaOH | 4.0 |
| Water | 68 |

To this solution was added six grams $CaCl_2$ in twenty grams of water. Only a faint trace of precipitate formed, indicating that the calcium bisulfite addition product of tetrakis(hydroxymethyl)phosphonium chloride water soluble.

EXAMPLE 21

Sodium meta-bisulfite (9.5 grams) and calcium chloride (eleven grams) were dissolved in fifty grams of water. A precipitate $Ca(HSO_3)_2$ formed immediately. Addition of ten grams of thirty-seven percent formaldehyde solubilized the $Ca(HSO_3)_2$ precipitate as the bisulfite addition product.

EXAMPLE 22

An aqueous solution of triethanolamine sulfite was prepared by adding 6.4 grams $SO_2$ to thirty grams triethanolamine in fifty grams water. To this solution was added fifteen grams tetrakis(hydroxymethyl)phosphonium chloride, two grams ammonium sulfate and one gram of an aqueous twenty-eight percent ammonia solution. The resulting solution was still stable after three hours standing at room temperature but polymerized on warming on a steam bath.

EXAMPLE 23

The following aqueous solution was prepared:

| Component: | Weight, grams |
|---|---|
| Tetrakis(hydroxymethyl)phosphonium chloride | 20 |
| $(NH_4)_2SO_3$ | 14.7 |
| $(NH_4)_2SO_4$ | 2.5 |
| Water | 60.8 |
| $NH_4OH$ (twenty-eight percent) | 2.0 |

This solution was stable after three hours' standing at room temperature but polymerized after heating on a steam bath.

EXAMPLE 24

The following aqueous solution was prepared:

| Component: | Weight, grams |
|---|---|
| Tetrakis(hydroxymethyl)phosphonium chloride | 20 |
| $K_2SO_3$ | 20 |
| $(NH_4)_2SO_4$ | 2.5 |
| Water | 57.5 |

This solution was stable after three hours' standing at room temperature but polymerized after heating on a steam bath.

It will be recognized by those skilled in the art that various modifications within the invention are possible, some of which have been referred to above. Therefore, we do not wish to be limited except as defined by the appended claims.

We claim:

1. A process for preparing a flame retardant cellulosic material which comprises impregnating the cellulosic material with an aqueous resin solution of a tetrakis(α-hydroxyorgano)phosphonium chloride compound, a water-soluble cyclic nitrogen-containing compound selected from the group consisting of triazines and dimethylol cyclic alkylene ureas, a nitrogen-containing salt of a strong inorganic acid, and a sulfite compound capable of combining with an aldehyde, whereby polymerization of the phosphonium compound, the cyclic nitrogen-containing compound and the nitrogen-containing salt is effected, and there is formed an aldehyde which is prevented from accelerating the polymerization by combination of the aldehyde with the sulfite, and, thereafter, drying and curing the thus-impregnated cellulosic material.

2. A process for preparing a flame-retardant cellulosic material which comprises contacting a cellulosic material to be treated with an aqueous solution containing between about 40 and about 80 percent by weight of water, between about 10 and about 30 percent by weight of a tetrakis(α-hydroxyorgano)phosphonium chloride compound having the formula:

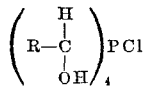

wherein R is selected from the group consisting of hydrogen, lower alkyls having between about 1 and about 3 carbon atoms, lower chlorinated alkyls having between about 1 and about 3 carbon atoms, lower alkenyls having from two to three carbon atoms, and lower chlorinated alkenyls having from two to three carbon atoms, between about 5 and about 15 percent by weight of a water-soluble, cyclic nitrogen-containing compound selected from the group consisting of triazines and dimethylol cyclic alkylene ureas, between about 0.9 and about 2.0 moles of a sulfite compound capable of combining with an aldehyde per mole of phosphonium compound, between about 0 and about 10 percent by weight of urea, and between about 1 and about 10 percent by weight of a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, whereby polymerization of the phosphonium compound, the cyclic nitrogen-containing compound, the urea, and the nitrogen-containing salt is effected and there is formed an aldehyde which is prevented from accelerating the polymerization by combination of the aldehyde with the sulfite, and, thereafter, drying and curing of the thus-treated cellulosic material.

3. The process as claimed in claim 2 wherein the phosphonium compound is tetrakis (hydroxymethyl) phosphonium chloride.

4. A process as claimed in claim 2 wherein the sulfite compound is an alkali metal sulfite.

5. The process as claimed in claim 4 wherein the alkali metal sulfite is sodium sulfite.

6. The process as claimed in claim 2 wherein the nitrogen-containing salt of a strong acid is ammonium sulfate.

7. The process as claimed in claim 2 wherein the water-soluble cyclic nitrogen-containing compound is trimethylolmelamine.

8. A process for preparing a flame-retardant cellulosic textile which comprises contacting a cellulosic textile to be treated with an aqueous solution containing between about 50 and about 70 percent by weight of water, between about 10 and about 30 percent by weight of tetrakis(hydroxymethyl)phosphonium chloride, between about 5 and about 15 percent by weight of trimethylolmelamine, between 0 and about 10 percent of urea, between about 1 and about 1.4 moles of sodium sulfite per mole of the tetrakis(hydroxymethyl)phosphonium chloride, and between about 1 and about 10 percent by weight of ammonium sulfate, whereby polymerization of the tetrakis(hydroxymethyl)phosphonium chloride, the trimethylolmelamine, the urea, and the ammonium sulfate is effected and there is formed an aldehyde which is prevented from accelerating the polymerization by combination of the aldehyde with the sodium sulfite, and thereafter, drying and curing the thus-treated cellulosic material.

9. A process for preparing a flame-retardant cellulosic textile which comprises impregnating the cellulosic textile to be treated with an aqueous solution containing between about 50 and about 70 percent by weight of water, between about 10 and about 30 percent by weight of tetrakis(hydroxymethyl)phosphonium chloride, between about 5 and about 15 percent by weight of trimethylolmelamine, between about 0.9 and about 2.0 moles of sodium sulfite per mole of tetrakis(hydroxymethyl)phosphonium chloride, and between 0 and about 10 percent by weight of urea, contacting the resulting impregnated cellulosic textile with an aqueous solution of a nitrogen-containing salt of a strong inorganic acid in a proportion equivalent to between about 2 and about 40 percent by weight of the resin forming ingredients on the cellulosic textile, whereby polymerization of the tetrakis(hydroxymethyl)phosphonium chloride, the trimethylolmelamine, the urea, and the nitrogen-containing salt is effected and there is formed an aldehyde which is prevented from accelerating the polymerization by combination of the aldehyde with the sodium sulfite, and, thereafter, drying and curing the thus-impregnated cellulosic textile.

10. The process as claimed in claim 9 wherein the resulting cured cellulosic textile contains between about 9 and about 30 percent by weight of resin add-on.

11. A flame-retarding cellulosic material comprised of a cellulosic material impregnated with a resin comprised of the polymerization product of a tetrakis(α-hydroxyorgano)phosphonium chloride compound, a water-soluble cyclic nitrogen-containing compound selected from the group consisting of triazines and dimethylol cyclic alkylene ureas, and a nitrogen-containing salt of a strong inorganic acid, the resin being formed in the presence of a sulfite compound capable of combining with an aldehyde, whereby an aldehyde is formed during the polymerization reaction which is prevented from accelerating the polymerization by combination of the aldehyde with the sulfite.

12. A flame-retardant cellulosic material comprised of a cellulosic material impregnated with a resin comprised of the polymerization product of between about 20 and about 90 percent by weight of a tetrakis(α-hydroxyorgano)phosphonium chloride compound having the formula:

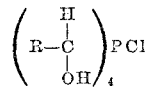

wherein R is selected from the group consisting of hydrogen, lower alkyls having between one and about three carbon atoms, lower chlorinated alkyls having between about one and about three carbon atoms, lower alkenyls having two to three carbon atoms, and lower chlorinated alkenyls having from two to three carbon atoms, between about 10 and about 60 percent by weight of a water-soluble cyclic nitrogen-containing compound selected from the group consisting of triazines and dimethylol cyclic alkylene ureas, between about 0 and about 40 percent by weight of urea, and between about 2 and about 40 percent by weight of a nitrogen-containing salt of a strong inorganic acid selected from the group consisting of ammonium salts of strong inorganic acids, primary amine salts of strong inorganic acids, aromatic amine salts of strong inorganic acids, and cyclic amine salts of strong inorganic acids, the resin polymerization product being formed in the presence of a sulfite compound capable of combining with an aldehyde, whereby an aldehyde is formed during the polymerization reaction which is prevented from accelerating the polymerization by combination of the aldehyde with the sulfite.

13. The cellulosic material as claimed in claim 12 wherein the resin add-on is between about 9 and about 30 percent by weight of the cellulosic material.

14. A flame-retardant cellulosic material comprised of a cellulosic material impregnated with a resin comprised of the polymerization product of tetrakis(hydroxymethyl) phosphonium chloride in a proportion equivalent to between about 20 and about 90 percent by weight, trimethylolmelamine in a proportion equivalent to between about 10 and about 60 percent by weight, ammonium sulfate in a proportion equivalent to between about 2 and about 40 percent by weight and urea in a proportion equivalent to between about 0 and about 40 percent by weight, of said resin forming ingredients, the resin being formed in the presence of sodium sulfite, whereby an aldehyde is formed during the polymerization reaction which is prevented from accelerating the polymerization by combination of the aldehyde with the sodium sulfite.

15. A textile treating composition comprised of between about 10 and about 30 percent by weight of a tetrakis(α - hydroxyorgano)phosphonium chloride compound having the formula:

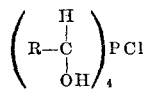

wherein R is selected from the group consisting of hydrogen, lower alkyls having between about one and about three carbon atoms, lower chlorinated alkyls having between about one and about three carbon atoms, lower alkenyls having from two to three carbon atoms, and lower chlorinated alkenyls having from two to three carbon atoms, between about 5 and about 15 percent by weight of a water-soluble cyclic nitrogen-containing compound selected from the group consisting of triazines and dimethylol cyclic alkylene ureas, between about 1 and about 10 percent by weight of a nitrogen-containing salt of a strong inorganic acid, selected from the group consisting of ammonium salts of strong inorganic acids, primary amine salts of strong inorganic acids, aromatic amine salts of strong inorganic acids, and cyclic amine salts of strong inorganic acids, between 0 and about 10 percent by weight of urea, between about 40 and about 80 percent by weight of water, and between 0.9 and about 2 moles of a sulfite compound capable of combining with an aldehyde, per mole of said phosphonium chloride compound, which composition reacts to form a polymerizaiton product of the phosphonium compound, the cyclic nitrogen-containing compound, the nitrogen-containing salt, and the urea, and an aldehyde which is prevented from accelerating the polymerization by combination of the aldehyde with the sulfite.

16. The composition as claimed in claim 15 wherein the sulfite compound is an alkali metal sulfite.

17. The composition as claimed in claim 15 wherein the sulfite compound is a tertiary amine sulfite.

18. A textile treating composition comprised of between about 10 and about 30 percent by weight of tetrakis(hydroxymethyl)phosphonium chloride, between about 5 and about 15 percent by weight of trimethylolmelamine, between about 1 and about 10 percent by weight of ammonium sulfate, between about 0 and about 10 percent by weight of urea, between about 50 and about 70 percent by weight of water, and between about 1 and about 1.4 moles of sodium sulfite per mole of tetrakis(hydroxymethyl)phosphonium chloride, which composition reacts to form a polymerization product of the tetrakis(hydroxymethyl)phosphonium chloride, the trimethylolmelamine, the ammonium sulfate, and the urea, and an aldehyde which is prevented from accelerating the polymerization by combination of the aldehyde with the sodium sulfite.

19. A cellulosic material treating composition comprised of a tetrakis(α-hydroxyorgano)phosphonium chloride compound, a water-soluble cyclic nitrogen-containing compound selected from the group consisting of triazines and dimethylol cyclic alkylene ureas, a nitrogen-containing salt of a strong inorganic acid, a sulfite compound capable of combining with an aldehyde, and water, which composition reacts to form a polymerization product containing the phosphonium compound, the cyclic nitrogen-containing compound and the nitrogen-containing salt, and an aldehyde which is prevented from accelerating the polymerization by combination of the aldehyde with the sulfite.

References Cited in the file of this patent
UNITED STATES PATENTS

| | | |
|---|---|---|
| 2,523,626 | Jones et al. | Sept. 26, 1950 |
| 2,870,041 | Waddle et al. | Jan. 20, 1959 |
| 2,993,746 | Miles et al. | July 25, 1961 |

OTHER REFERENCES

Guthrie et al.: "Application of the THPC Flame-Retardant Process to Cotton Fabrics," Proceedings of the American Association of Textile Chemists and Colorists, pages 1–5, May 9, 1955.

UNITED STATES PATENT OFFICE

CERTIFICATE OF CORRECTION

Patent No. 3,101,278            August 20, 1963

George M. Wagner et al.

It is hereby certified that error appears in the above numbered patent requiring correction and that the said Letters Patent should read as corrected below.

Column 11, line 60, for "2,7" read -- 2.7 --.

Signed and sealed this 18th day of May 1965.

(SEAL)
Attest:

ERNEST W. SWIDER            EDWARD J. BRENNER
Attesting Officer            Commissioner of Patents